(12) United States Patent
Gray et al.

(10) Patent No.: US 8,980,207 B1
(45) Date of Patent: *Mar. 17, 2015

(54) METHOD AND SYSTEM FOR REMOVAL OF MERCURY FROM A FLUE GAS

(71) Applicant: URS Corporation, Austin, TX (US)

(72) Inventors: Sterling M. Gray, Austin, TX (US);
James B. Jarvis, Austin, TX (US);
Steven W. Kosler, Austin, TX (US)

(73) Assignee: URS Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,909

(22) Filed: Sep. 18, 2014

Related U.S. Application Data

(63) Continuation of application No. 14/291,707, filed on May 30, 2014, now Pat. No. 8,865,099.

(60) Provisional application No. 61/935,884, filed on Feb. 5, 2014.

(51) Int. Cl.
*B01D 53/50* (2006.01)
*B01D 53/64* (2006.01)

(52) U.S. Cl.
CPC ............... *B01D 53/50* (2013.01); *B01D 53/64* (2013.01)
USPC ........................................................ 423/210

(58) Field of Classification Search
CPC ............................... B01D 53/50; B01D 53/64
USPC .................................................. 423/210, 242.1
See application file for complete search history.

(56) References Cited

U.S. PATENT DOCUMENTS

| 3,838,190 | A  | * | 9/1974  | Birke et al. | ..................... 423/210 |
| 8,865,099 | B1 | * | 10/2014 | Gray et al.  | ..................... 423/210 |

* cited by examiner

*Primary Examiner* — Timothy Vanoy
(74) *Attorney, Agent, or Firm* — DuBois, Bryant & Campbell LLP; William D. Wiese

(57) ABSTRACT

Processes and methods exist for decreasing emissions of mercury upon combustion of fossil fuels such as coal. Halide salts can be effective when used at locations where they are thermally decomposed to form reactive halogen species, or in combination with an adsorbent material such as activated carbon. Halide salts, such as calcium bromide and sodium bromide, are not typically used at locations downstream of the economizer, where the temperature is typically below around 500° C., because these salts are non-thermolabile and do not decompose to produce reactive halogen species. However, in flue gas streams that certain flue gas constituents, such as sulfur trioxide or sulfuric acid, reactive halogen species can be produced via chemical reaction. These species react with elemental mercury through various means to form an oxidized form of mercury that is more easily captured in downstream pollution control devices such as particulate control devices or $SO_2$ scrubbers.

13 Claims, 2 Drawing Sheets

METHOD AND SYSTEM FOR REMOVAL OF MERCURY FROM A FLUE GAS

PRIORITY STATEMENT UNDER 35 U.S.C. §119

The present U.S. Patent Application is a continuation of U.S. patent application Ser. No. 14/291,707, filed May 30, 2014, now U.S. Pat. No. 8,865,099, issued Oct. 21, 2014, in the names of Sterling M. Gray, James B. Jarvis, and Steven W. Kosler, entitled "METHOD AND SYSTEM OF REMOVAL OF MERCURY FROM A FLUE GAS," which claims priority pursuant to 35 U.S.C. §119(e) to U.S. Provisional Application Ser. No. 61/935,884, filed Feb. 5, 2014, in the names of Sterling M. Gray, James B. Jarvis, and Steven W. Kosler, entitled "METHOD AND SYSTEM OF MERCURY REMOVAL FROM A FLUE GAS," the disclosure of each of which is hereby incorporated by reference in its entirety.

BACKGROUND OF THE INVENTION

This invention relates to a method for removing mercury from flue gas produced in a fossil fuel energy conversion plant. Mercury and mercury-containing compounds are present in varying amounts in fossil fuels. As the fuels are burned, the mercury enters the flue gas stream, and a portion of this mercury can ultimately be emitted from the stack. While the concentrations of mercury in the flue gas are usually low and of little concern, emitted mercury ultimately finds its way to surface water, where it is converted to more toxic compounds and can be concentrated in fish and other species in the food supply. As a result, even low levels of mercury pose a significant risk to public health, and regulations will increasingly require fossil fuel-burning plants to reduce or eliminate the amount of mercury the emit.

Various forms of mercury can exist within the flue gas, and the form of the mercury plays a key role in determining how much mercury is emitted. Mercury compounds in the fuel are converted to vapor-phase, elemental mercury in the boiler. Once the flue gas leaves the boiler, some of the elemental mercury can be oxidized to a form such as $Hg^{+2}$, or alternatively, adsorbed onto fly ash. Many factors are involved, but as a consequence, the flue gas contains a mixture of varying levels of elemental, oxidized and particulate mercury.

Some of the mercury in the flue gas can be removed using the pollution control equipment often found in coal-fired power plants. Particulate mercury would be removed in equipment that is used to collect the fly ash, and electrostatic precipitators or fabric filters are examples of equipment that can accomplish this. Similarly, oxidized mercury is very soluble and is easily removed in equipment that is used to control sulfur dioxide ($SO_2$) emissions. Wet or dry flue gas desulfurization systems are examples of equipment that can control oxidized mercury. In addition, oxidized mercury is more easily converted to particulate mercury along the flue gas path.

While particulate and elemental mercury can be controlled using methods that are well known in the art, elemental mercury is not as easily controlled. Unlike oxidized mercury, elemental mercury is not soluble and is therefore not captured in the $SO_2$ control step. Consequently, elemental mercury tends to pass through the emission control equipment and is emitted through the stack. Thus, a common strategy for controlling mercury emissions is to oxidize the elemental mercury in the flue gas so that it can then be efficiently removed in downstream emission control equipment. Indeed, this is the primary purpose of the invention discussed in this document.

Halogens play an important role with respect to the form of the mercury in the flue gas. Halogens, which include the elements chlorine, bromine, iodine and fluorine, occur naturally in coal. They serve the important function of promoting the oxidation of elemental mercury along the flue gas path. There are a variety of mechanisms that can accomplish this. For example, some halogen-containing compounds are oxidizing agents that can directly oxidize elemental mercury. Alternatively, halogen-containing compounds can work in combination with other materials to help catalyze mercury oxidation. One example of this is the beneficial effect of halogens on mercury oxidation within a selective catalytic reduction (SCR) system. Similarly, halogen compounds can help oxidize and then retain mercury when present as a component of a sorbent material such as activated carbon.

Those familiar with the art understand that the halogens must be present in a reactive form to promote mercury oxidation. Reactive forms include the hydrogen halide (e.g., hydrobromic acid—HBr), the atomic form of the halogen (e.g., atomic bromine—Br), or the molecular form of the halogen (e.g., molecular bromine—$Br_2$). Consequently, the prior art focuses on introducing or producing these reactive halogen forms. There are a variety of ways to accomplish this. For example, halogen-containing compounds can be added to the boiler system and/or flue gas at a location where they are thermolabile (i.e., at a location where high temperatures cause decomposition to form reactive halogen species). Alternatively, halogen-containing compounds can decomposed to reactive halogen species at high temperature in equipment external to the flue gas duct and the reactive halogen species can then be added to the flue gas at any location. Another option is to add reactive halogen species, such as HBr or $Br_2$, directly added to the flue gas, and yet another option is for various halogen-containing species to be used in conjunction with a sorbent material such as activated carbon and the combined material can serve to catalytically oxidize and then adsorb mercury.

One way to produce reactive halogens is to use a fuel (or fuel blend) with a higher halogen content. At the high temperatures that exist within the boiler itself, the halogens are converted to reactive forms (although the proportions of the various forms depend on which halogen is being considered). The reactive halogen species leave the boiler and then help to promote mercury oxidation via the mechanisms discussed above. Extensions of this concept include the addition of halogen-containing additives to the fuel and the injection of halogen-containing additives within the furnace. As with the naturally-occurring halogens, the halogens in the additives are decomposed at high temperatures to form the reactive halogen species.

The prior art contains many examples where the elevated temperature in the boiler is used to produce reactive halogen species. For example, U.S. Pat. No. 7,507,083 B2 issued to Comrie describes a method in which sorbent compositions containing halogens such as bromine and iodine are injected onto the fuel or into the combustion chamber where the temperature is higher than about 1,500° F. Similarly, U.S. Pat. No. 6,878,358 issued to Vosteen, et al. describes a process in which a bromine compound is fed to a multistage furnace and/or the flue gas in the plant section downstream of the furnace, the temperature during contact of the bromine compound with the flue gas being at least 500° C. and preferably at least 800° C. Finally, U.S. Patent Application No. 2011/0250111 A1 filed by Pollack, et al. describes a method of removing mercury from a flue gas using molecular halogen or halogen precursors.

While the described invention is not limited by the zone where the molecular halogen or halogen precursor is introduced into the exhaust gas stream, the temperature in the injection zone must be sufficiently high to allow dissociation and/or oxidation of the elemental halogen from the halogen precursor, meaning that the temperature at the injection zone must be greater than about 1,000° F., and in some embodiments, greater than about 1,500° F.

The above examples use high temperatures along the flue gas path for decomposition of the halogen salts. It is also possible to use high-temperature systems external to the flue gas path to accomplish the same objective. Here, the reactive halogen species would be produced in a separate device and then introduced into the flue gas stream for reaction with the mercury. Examples of this approach include U.S. Patent Application No. 2007/0051239 A1 filed by Holmes, et al., which describes a method of producing atomic halogen radicals using a high-temperature/high-energy chamber for creating dissociated halogen, to be supplied to the gas stream, with or without carbonaceous material.

Similarly, U.S. Patent Application No. 2010/0284872 A1 filed by Gale, et al. describes a two-step process that first produces an acid halide by reaction of a halogen salt with steam at temperatures from about 650 to 1,000° C. (temperatures from 700 to 800° C. being preferred). This is followed by catalyzed reaction of the acid halide to the molecular halogen, which is then injected into the flue gas stream.

Many halide salts ($CaBr_2$ and HBr being examples) cannot be thermally decomposed at temperatures below 1,000° F. That is, these salts are not thermolabile, and this property explains why they are employed at higher temperatures for the purpose of generating reactive halogen species. There are, however, halogen-containing compounds that are thermolabile at temperatures below 1,000° F. These include the ammonia halides (e.g., $NH_4Cl$), the so-called interhalogens, and a variety of organic, halogen-containing species. These compounds share the common characteristic of decomposing into reactive halogen species as a result of being thermolabile at the temperature at the injection location.

The most obvious means for introducing reactive halogen species is to add them directly to the flue gas. As an example, U.S. Pat. No. 8,580,214 B2, filed by Moore, et al. discusses introducing a hydrogen halide selected from HBr and HI. One drawback of such technologies is that the reactive halogen species can be highly toxic, corrosive and difficult to handle.

Some halogen-containing materials can be used at temperatures below which they are thermolabile when combined with a sorbent material such as activated carbon. The use of brominated activated carbon is well documented. Here, sorbent materials can be impregnated with brominated compounds that might not otherwise be reactive at the injection location. The brominated sorbent material serves to catalytically oxidize the mercury. Then, the sorbent can retain the mercury, where it can be removed along with the sorbent in downstream particulate removal equipment.

Brominated sorbents can be produced by combining the bromine-containing compounds and the sorbent before, during or after injection into the flue gas path. Commercially-available activated carbons are brominated prior to injection. However, this is not always the case. For example, U.S. Patent Application US 2012/0308454 A1, filed by Heuter, et al. discusses a method whereby bromine-containing compounds and carbon-containing adsorbents (activated carbon or activated coke) are added to the flue gas as a mixture, or upstream relative to the flue gas flow, are brought into contact with carbon-containing adsorbents introduced in the form of a cloud of flue gas dust into the flue gas stream.

As discussed herein, there are a variety of ways to introduce reactive halogen species into a flue gas stream. Once introduced, they promote mercury oxidation through various means, resulting in a form of mercury that can be removed from the flue gas stream using equipment designed for the removal of other pollutants. Unfortunately, many of the techniques of the prior art have undesirable consequences on the operation of the equipment or the equipment itself. For example, the addition of halogens to the fuel or within the boiler can result in corrosion of metal surfaces within the boiler. Similarly, other compounds (such as ammonia) may be produced, causing equipment fouling or contributing to additional emissions from the facility. Therefore, there is a need for a method that employs reasonably non-toxic additives, injected downstream of the boiler itself, which does not require the use of supplemental adsorbents.

SUMMARY OF THE INVENTION

Processes and methods are provided for decreasing emissions of mercury upon combustion of fossil fuels such as coal. In some embodiments, a halide salt, such as sodium bromide, is injected into the flue gas path between the economizer and the stack where the temperature is typically below around 500° C. Because many of the halide salts are non-thermolabile at temperatures below around 500° C., they do not produce reactive halogen species and are therefore not effective in oxidizing elemental mercury. However, some flue gas streams contain certain flue gas constituents, such as sulfur trioxide or sulfuric acid, which react with halide salts to form reactive halogen species. These species can then react with elemental mercury to produce an oxidized form of mercury by various means. This oxidized mercury can then be captured using downstream flue gas cleaning devices such as the particulate control device or $SO_2$ scrubber.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
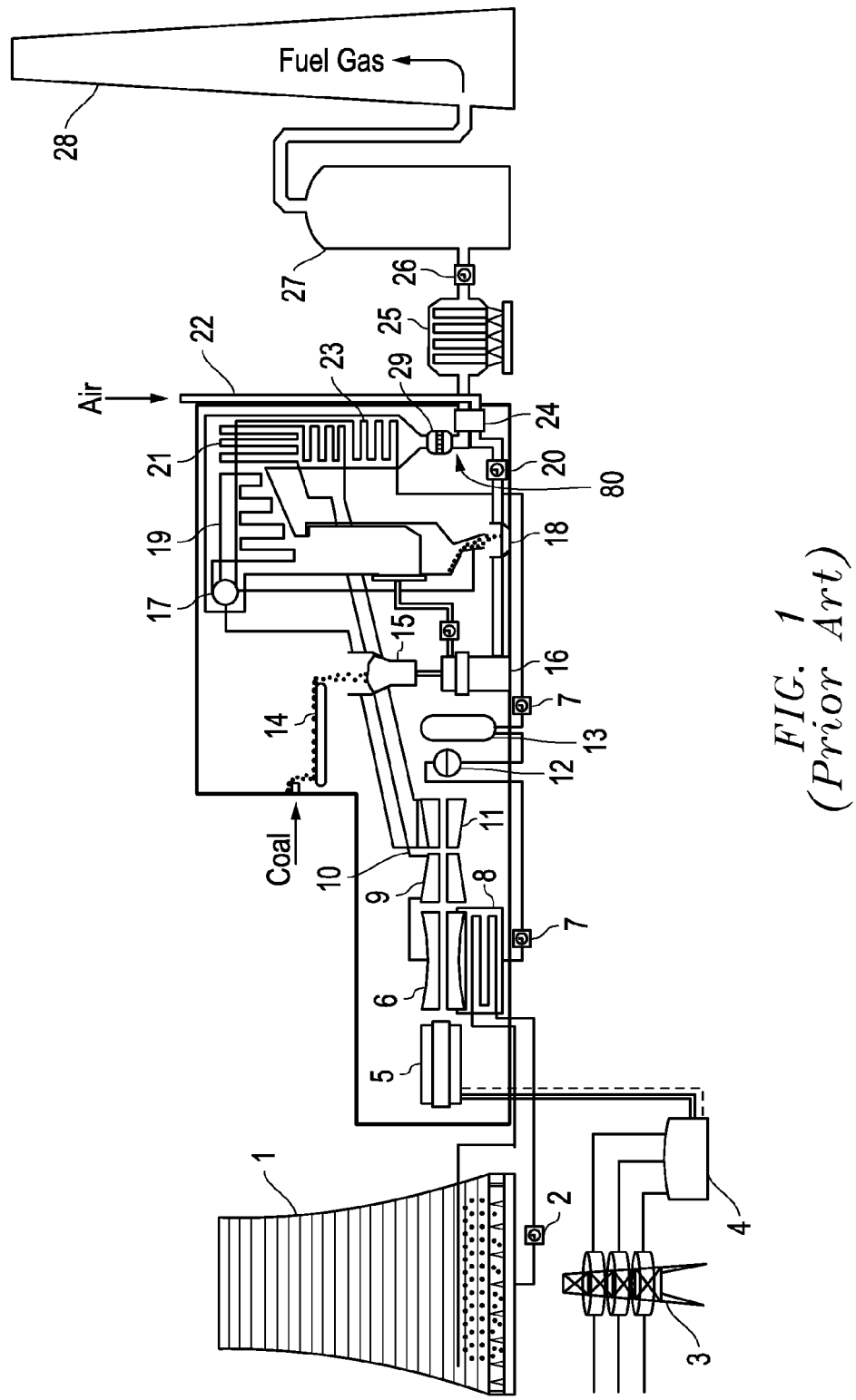
FIG. 1 depicts the layout of a typical coal fired power plant.

The present invention is directed to improved methods and systems for, among other things, removing elemental mercury from a flue gas. The configuration and use of the presently preferred embodiments are discussed in detail below. It should be appreciated, however, that the present invention provides many applicable inventive concepts that can be embodied in a wide variety of contexts other than the removal of mercury from a flue gas. Accordingly, the specific embodiments discussed are merely illustrative of specific ways to make and use the invention, and do not limit the scope of the invention. In addition, the following terms shall have the associated meaning when used herein:

"emission control device" means any device for the removal of emissions from a flue gas stream, including an electrostatic precipitator, a fabric filter, and a wet scrubber;

"flue gas" means an exhaust gas that is produced from an industrial process and includes both gas that will be used in connection with the process from which it is produced or even another related process (e.g., to produce heat), which will exit into the atmosphere via a stack for conveying waste exhaust gases from an industrial process. The flue gas can be produced from any industrial process such as a power generating process, metal smelting process and the like, wherein any form of mercury is present in the flue gas;

"fixed structure" means a non-moving, solid object containing chemical agents that is placed into the flue gas stream;

"halide salt" means any salt of a halide including, without limitation, salts that contain a halogen anion, such as chloride, bromide, fluoride or iodide, and a non-hydrogen cation such as sodium, magnesium, calcium or potassium, including by way of example sodium bromide, sodium chloride, sodium fluoride, sodium iodide, calcium bromide, calcium chloride, calcium fluoride, calcium iodide, magnesium bromide, magnesium chloride, magnesium fluoride, magnesium iodide, potassium bromide, potassium chloride, potassium fluoride and potassium iodide;

"injecting" means the introduction of a material into a flue gas from a point external to the duct work containing the flue gas, and includes the introduction of a liquid phase solution or a powder into the flue gas, and the placement of a solid in the flue gas stream;

"mercury" means any form of mercury, including without limitation, all oxidized forms of Hg, elemental Hg and particulate-bound mercury;

"molecular halogen" means any halogen in molecular form, such as $Br_2$, $Cl_2$, and $F_2$, and products resulting from the disassociation of the molecular halogen, such as the dissociation of $Br_2$ to form a Br radical, Br anion, Br cation, or a combination thereof;

"reactive halogen precursors" means halogen-containing chemicals that are not reactive halogen species, but that can be decomposed or converted into reactive halogen species in some manner (such as thermal decomposition);

reactive halogen species" means halogen-containing species that can cause the oxidation of mercury by one means or another. Examples of reactive halogen species include the atomic form of the halogen (Cl, Br, I or F), the molecular form of the halogen ($Br_2$, $Cl_2$, $I_2$ and $F_2$), and the hydrogen halides (HCl, HBr, HI and HF); and "sulfuric acid" means sulfuric acid, present in either the vapor phase or condensed as a liquid, and sulfur trioxide, which is the anhydrous form of vapor-phase sulfuric acid.

Referring now to FIG. 1 which depicts a typical plant configured to burn fossil fuels to produce energy. For example, for a coal-fired boiler, coal is conveyed 14 from an external location (a coal pile or barge, etc.) and ground to a very fine powder by large metal spheres in the pulverized fuel mill 16. The pulverized coal is mixed with preheated air 24 driven by the forced draft fan 20.

The hot air-fuel mixture is forced at high pressure into the boiler where it rapidly ignites. Water of a high purity flows vertically up the tube-lined walls of the boiler, where it turns into steam to begin the process of extracting the heat energy from the flue gas. The steam produced in the boiler is used to produce electrical energy using a system of turbines and ancillary equipment, and condensate produced from the steam is recycled to the boiler beginning at the economizer 23. The energy extracted into the boiler water causes the temperature of the flue gas to decrease, and at the point where the flue gas leaves the economizer, the temperature is typically within the range of 600 to 800° F.

The temperature of the flue gas at the economizer outlet (600 to 800° F.) is significant. At this temperature, many halide salts are non-thermolabile and are not considered reactive halogen precursors (which explains why these salts are commonly applied to the fuel or injected into the boiler, where the temperature exceeds at least 1,000° F.).

To improve thermal efficiency, the flue gas from the economizer is further cooled by the incoming combustion air in the air preheater 24, where the flue gas temperature is typically reduced to within the range of 220 to 400° F.

The flue gas path between the economizer and the stack 28 typically contains emission control equipment to remove various flue gas contaminants. Equipment typically found upstream of the air preheater can include a selective catalytic reduction (SCR) system to reduce $NO_x$ emissions. Equipment typically found downstream of the air preheater can include a dry or wet electrostatic precipitator (ESP or WESP) for removal of particulate, a fabric filter (bag house) and a wet or dry flue gas desulfurization (FGD) system. Other common emission control systems include equipment for removal of sulfuric acid and equipment for injecting activated carbon. All of these emission control systems play a role in removing mercury from the flue gas and are affected by the presence of reactive halogen species.

The composition of the flue gas leaving the boiler depends on what is being burned, but it will usually consist of mostly nitrogen (typically more than two-thirds) derived from the combustion air, carbon dioxide ($CO_2$), and water vapor as well as excess oxygen (also derived from the combustion air). The flue gas also typically contains a small percentage of a number of pollutants, such as particulate matter, carbon monoxide, nitrogen oxides, and sulfur oxides and mercury.

Sulfuric acid is a pollutant that can be found at widely varying levels in the flue gas from coal-fired boilers and other combustion sources and processes. For coal-fired boilers, most of the sulfur in the fuel is converted to sulfur dioxide. However, a small fraction of the fuel sulfur is further oxidized to sulfur trioxide (the anhydrous form of sulfuric acid). The amount of sulfur trioxide ($SO_3$) that is present in the flue gas is a function of many variables, including the fuel sulfur content, the design of the boiler, the excess oxygen concentration and the chemical composition of the fly ash. Further, $SO_3$ can be produced within the SCR reactor at levels that depend on the catalyst type, the temperature and the operating conditions for the system. As a result of these factors, the $SO_3$ concentration can vary widely.

In some cases, it is desirable to remove the sulfuric acid from the flue gas. This is typically accomplished through a reaction between the $SO_3$ (or the vapor-phase sulfuric acid) and an alkaline solid material such as hydrated lime or sodium carbonate. In the case of sodium carbonate, a substitution reaction causes the absorption of sulfuric acid with the liberation of $CO_2$.

Many of the halide salts are inert at the temperatures that exist downstream of the economizer (typically below 800° F.). This explains why these salts are typically added to the fuel or to the boiler (where temperatures exceed at least 1,000° F.) or are used in combination with an absorbent such as activated carbon. In the presence of certain flue gas species, an example being sulfuric acid, substitution reactions and/or redox reactions, depending on which halide salt is present, can cause the otherwise inert halide salts to liberate reactive halogen species. This effect has been noted in the laboratory, and it occurs at temperatures characteristic of that downstream of the boiler economizer and also at temperatures characteristic of that downstream of the air preheater.

Figure 2:
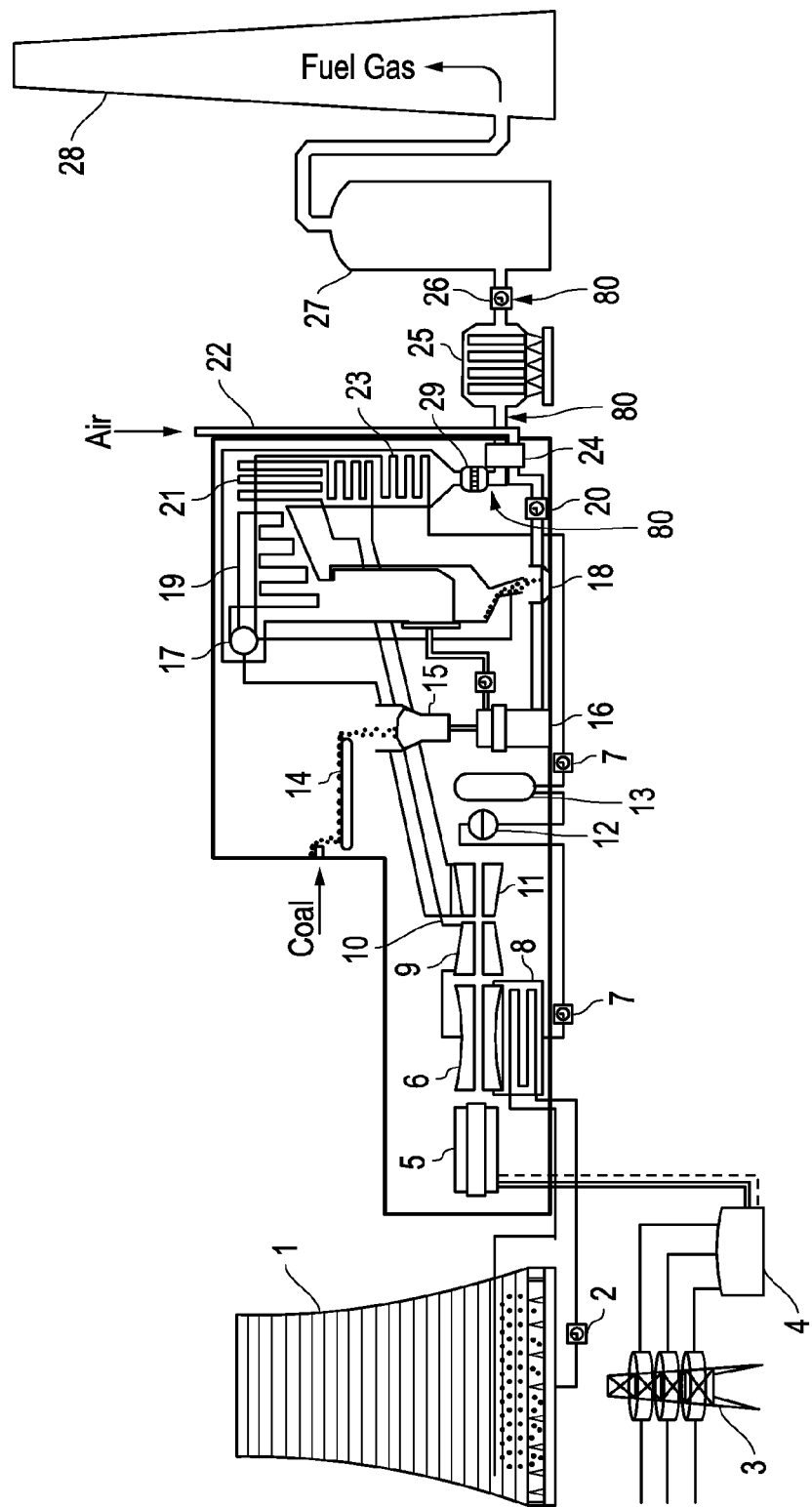
FIG. 2 shows the locations of injection of halide salts of certain embodiments of the present invention

Referring now to FIG. 2, which shows points of injection of a halide salt, such as sodium bromide, into the flue gas path at any point between the economizer, where the temperature is typically below around 800° F., and the final emission control equipment prior to the stack. The halide salt may be injected or placed, for the purpose of example, between the economizer 23 and the SCR 29, between the SCR 29 and the air preheater 24, between the air preheater 24 and the particulate removal 25, or between the particulate removal 25 the flue gas desulfurization system 27. In each case, the halide salt would be non-thermolabile at the temperature of the injection location. In those cases where the composition of the flue gas stream included constituents that are reactive with the halide salts, such as sulfuric acid, reactive halogen species will be formed, which may affect the form of the mercury, or may affect the operation of downstream emission control equipment, causing a net reduction in mercury emissions from the stack.

An effective pathway for production of reactive halogen species is to react the solid form of the halide salt with a vapor-phase flue gas constituent. Thus, halide salts can be injected in the form of a solid (e.g., a powder), or placed into the flue gas stream as part of a fixed structure containing the halide salt with or without other materials, or injected into the duct as a solution of the halide salt, whereby the water portion of the solution is evaporated to leave the halide salt in the solid form.

As might be expected, the formation of reactive halogen species, as evidenced by changes in the concentration and form of flue gas mercury, depends on various factors including the concentration of the halide salt and the concentrations of flue gas constituents that cause the formation of reactive halogen species. It is noteworthy, however, that reactive halogen species can be formed even commensurate with the process of sulfuric acid removal. In one test, halide salts were injected into the duct of a coal-fired plant as part of a solution containing variable levels of sodium carbonate, and including no sodium carbonate. The injection of sodium carbonate is known to cause the removal of sulfuric acid from the flue gas. A net reduction in mercury emissions was noted both with and without the presence of the sodium carbonate in solution.

While the present device has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible mercury removal methods and systems available, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for treating a flue gas stream, comprising:
   injecting a halide salt into a flue gas stream, wherein the halide salt is not thermolabile at the temperature of the flue gas stream at the point of injection.

2. A method for treating a flue gas stream, comprising:
   injecting a halide salt solution into a flue gas stream in combination with other salts, wherein the halide salt is not thermolabile at the temperature of the flue gas stream at the point of injection.

3. A method for treating a flue gas stream, comprising:
   injecting a halide salt into a flue gas stream, wherein the halide salt is not thermolabile at the temperature of the flue gas stream at the point of injection; and
   chemically reacting the halide salt with constituents in the flue gas stream to form reactive halogen species.

4. A method for treating a flue gas stream, comprising:
   injecting a halide salt into a flue gas stream at a location between an economizer and a scrubber.

5. The method of claim 1, wherein the halide salt is sodium bromide.

6. The method of claim 1, wherein the halide salt is sodium chloride.

7. The method of claim 1, wherein the halide salt is dissolved into a liquid-phase solution before injection into the flue gas stream.

8. The method of claim 1, wherein the halide salt is injected into the flue gas stream as a powder.

9. The method of claim 1, wherein the halide salt is injected into the flue gas stream by placing a solid structure containing the halide salt in the flue gas stream.

10. The method of claim 1, wherein the temperature of injection is less than about 1,000 F.

11. The method of claim 1, wherein the temperature of injection is less than about 1,000 F and greater than about 200° F.

12. The method of claim 1, wherein a constituent in the flue gas stream is sulfur trioxide or sulfuric acid.

13. The method of claim 1, wherein the halide salt reacts with sulfur trioxide or sulfuric acid in the flue gas stream to produce the reactive halogen species.

* * * * *